(12) United States Patent
Xia (10) Patent No.: US 10,935,827 B1
(45) Date of Patent: Mar. 2, 2021

(54) BACK PLATE, BACKLIGHT MODULE AND DISPLAY DEVICE

(71) Applicants: K-TRONICS (SUZHOU) TECHNOLOGY CO., LTD., Suzhou (CN); BOE TECHNOLOGY GROUP CO., LTD., Beijing (CN)

(72) Inventor: Xiaoli Xia, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/837,603

(22) Filed: Apr. 1, 2020

(30) Foreign Application Priority Data

Sep. 2, 2019 (CN) .......................... 201910846955.1

(51) Int. Cl.
*G02F 1/1333* (2006.01)

(52) U.S. Cl.
CPC ............... *G02F 1/133308* (2013.01); *G02F 2001/133314* (2013.01); *G02F 2001/133317* (2013.01); *G02F 2202/28* (2013.01)

(58) Field of Classification Search
CPC ... G02F 1/133308; G02F 2001/133317; G02F 2001/133314; G02F 2202/28
See application file for complete search history.

(56) References Cited

U.S. PATENT DOCUMENTS

| | | | |
|---|---|---|---|
| 2012/0257136 A1* | 10/2012 | Horiuchi | G02F 1/133308 349/58 |
| 2014/0126239 A1* | 5/2014 | Huang | G02B 6/0035 362/609 |
| 2020/0128700 A1* | 4/2020 | Lee | G02B 6/005 |

* cited by examiner

*Primary Examiner* — James A Dudek
(74) *Attorney, Agent, or Firm* — Kinney & Lange, P.A.

(57) ABSTRACT

A back plate, a backlight module, and a display device are provided. The back plate includes a first sub-back plate and a second sub-back plate connected to each other, wherein a thickness of the first sub-back plate is less than a thickness of the second sub-back plate, at least a part of a first main surface of the first sub-back plate is flush with a first main surface of the second sub-back plate, a gap space is formed on a second main surface of the first sub-back plate, and the first main surface of the first sub-back plate is arranged opposite to the second main surface of the first sub-back plate.

20 Claims, 9 Drawing Sheets

BACK PLATE, BACKLIGHT MODULE AND DISPLAY DEVICE

CROSS-REFERENCE TO RELATED APPLICATIONS

The present application claims a priority to Chinese Patent Application No. 201910846955.1 filed in China on Sep. 2, 2019, a disclosure of which is incorporated herein by reference in its entirety.

TECHNICAL FIELD

The present disclosure relates to the field of display technology, and in particular, to a back plate, a backlight module, and a display device.

BACKGROUND

At present, a design of using a glass back plate on a mobile phone is becoming more and more popular, and the glass back plates are gradually applied to large-sized display devices such as displays and televisions. However, due to a thickness of the glass and its characteristics of heat insulation, thickness thinning of the display device is limited. In addition, since ultra-thin glass is expensive, a thickness of a product is difficult to be ultra-thin due to a thickness of the glass back plate. Therefore, how to reduce overall thickness of the display device based on the design of using the glass back plate is an urgent problem to be solved.

SUMMARY

The present disclosure provides a back plate, a backlight module, and a display device.

According to a first aspect of the embodiments of the present disclosure, a back plate is provided. The back plate includes a first sub-back plate and a second sub-back plate connected to each other, wherein a thickness of the first sub-back plate is less than a thickness of the second sub-back plate, at least a part of a first main surface of the first sub-back plate is flush with a first main surface of the second sub-back plate, a gap space is formed on a second main surface of the first sub-back plate, and the first main surface of the first sub-back plate is arranged opposite to the second main surface of the first sub-back plate.

Optionally, the gap space is defined by the second main surface of the first sub-back plate and a side surface of the second sub-back plate.

Optionally, a material of the first sub-back plate is metal or plastic, and a material of the second sub-back plate is glass.

Optionally, the first sub-back plate is fixedly connected to the second sub-back plate or detachably connected to the second sub-back plate.

Optionally, the first sub-back plate includes a main body and a connecting part, a first main surface of the main body is flush with the first main surface of the second sub-back plate, an end of the connecting part is connected to the main body, and another end of the connecting part is located on a second main surface of the second sub-back plate and connected to the second sub-back plate, and the first main surface of the second sub-back plate is arranged opposite to the second main surface of the second sub-back plate.

Optionally, the gap space is defined by a second main surface of the main body and the connecting part.

Optionally, an end of the connecting part distal to the main body is connected to the second sub-back plate through a fixing piece, or the end of the connecting part distal to the main body is clamped with the second sub-back plate, or the end of the connecting part distal to the main body is connected to the second sub-back plate through an adhesive layer.

Optionally, the first sub-back plate includes a hook part provided at an end of the first sub-back plate distal to the second sub-back plate, and the hook part is located above a plane where at least a part of the first main surface of the first sub-back plate is flush with the first main surface of the second sub-back plate.

Optionally, an entirety of the first main surface of the first sub-back plate is flush with an entirety of the first main surface of the second sub-back plate.

Optionally, a heat dissipation hole is provided in the first sub-back plate.

Optionally, a thickness of the second sub-back plate 12 is 1.8 mm to 2.0 mm, and a thickness of the first sub-back plate 11 is 0.1 mm to 0.8 mm.

According to a second aspect of the embodiments of the present disclosure, a backlight module is provided. The backlight module includes the back plate as described above and a light bar, the first sub-back plate is arranged close to the light bar, and the second sub-back plate is arranged on a side of the first sub-back plate distal to the light bar.

Optionally, the backlight module further includes a frame, the frame is located above the first sub-back plate and the second sub-back plate, and the first sub-back plate and the second sub-back plate are both connected to the frame.

Optionally, the first sub-back plate and the second sub-back plate are connected to the frame by an adhesive tape.

Optionally, the first sub-back plate and the frame are snap-fitted to define a position of the first sub-back plate relative to a horizontal direction of the frame.

Optionally, the gap space is defined by the second main surface of the first sub-back plate and a side surface of the second sub-back plate.

Optionally, a material of the first sub-back plate is metal or plastic, and a material of the second sub-back plate is glass.

In the backlight module in another embodiment of the present disclosure, the backlight module includes the back plate as described above and a light bar, wherein the light bar is arranged in the hook part of the first sub-back plate.

According to a third aspect of the embodiments of the present disclosure, a display device is provided. The display device includes the backlight module as described above and a control panel, wherein at least a part of the control panel is arranged in the gap space.

In the display device in another embodiment of the present disclosure, the display device includes the backlight module as described above, a control panel, and a liquid crystal dispaly panel connected to the control panel, wherein at least a part of the control panel is arranged in the gap space, the liquid crystal display panel is located above the hook part of the first sub-back plate, and abuts against a surface of the hook part, and the surface of the hook part is distal to the plane where at least a part of the first main surface of the first sub-back plate is flush with the first main surface of the second sub-back plate.

DETAILED DESCRIPTION

Exemplary embodiments will be described in detail herein, examples of which are illustrated in the accompanying drawings. When the following description relates to the accompanying drawings, same numbers in different accompanying drawings represent same or similar elements unless otherwise indicated. The implementations described in the following exemplary embodiments do not represent all implementations being consistent with the present disclosure. Rather, they are merely examples of devices being consistent with some aspects of the present disclosure as detailed in the appended claims.

Terms used in the present disclosure are for the purpose of describing particular embodiments only and are not intended to limit the present disclosure. Unless otherwise defined, technical or scientific terms used in the present disclosure shall be of ordinary meanings as understood by those of ordinary skills in the art to which the present disclosure belongs. The word "a" or "an" or the similar word used in the specification and claims of the present disclosure does not indicate a quantity limitation, but rather indicate that there is at least one. The word "include" or "comprise" or the similar word means that an element or article before "include" or "comprise" encompasses elements or objects listed after "include" or "comprise" and their equivalents, without excluding other elements or objects. The word "connecting" or "connected" or the similar word is not limited to physical or mechanical connections, and may include electrical connections, whether direct or indirect. The word "plurality of" includes two, which is equivalent to at least two. The terms "a", "said" and "the" in singular forms used in the specification and the appended claims of the present disclosure are also intended to include plural forms, unless the context clearly indicates other meanings. It should also be understood that the term "and/or" as used herein refers to and includes any or all possible combinations of one or more associated and listed items.

In the related art, a glass back plate is generally an integral structure, and a control panel connected to a liquid crystal display panel is generally arranged under the glass back plate, so that a thickness of a display device includes a thickness of the glass back plate and a thickness of the control panel. Furthermore, a light bar is arranged above the glass back plate. If heat generated by the light bar and the control panel during operation cannot be dissipated, and the heat is accumulated to a certain temperature, it will cause a backlight film to be wrinkled, resulting in an abnormal picture or even causing the glass to break. Therefore, in order to dissipate the heat, a method of providing holes in the glass back plate is adopted, so that internal heat is transmitted to outside through air. However, on one hand, this method increases cost. On the other hand, due to limitations of glass strength and appearance requirements, the number of openings in the glass back plate is limited, and heat dissipation effect of air is very limited, resulting in this heat dissipation method being unsatisfactory.

In some embodiments of the present disclosure, as shown in FIG. 1 to FIG. 7, a back plate 10 is provided. The back plate 10 includes a first sub-back plate 11 and a second sub-back plate 12 connected to each other. A thickness of the first sub-back plate 11 is less than a thickness of the second sub-back plate 12, at least a part of an upper surface of the first sub-back plate 11 is flush with an upper surface of the second sub-back plate 12, and a gap space 13 is formed on a lower surface of the first sub-back plate 11.

Figure 16:
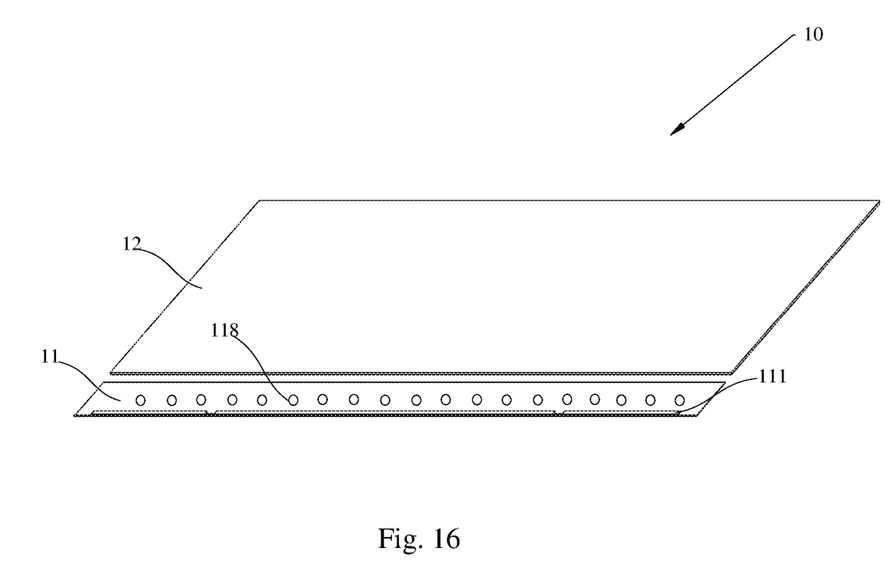
FIG. 16 is yet another three-dimensional structure schematic diagram of the first sub-back plate and the second sub-back plate in some embodiments of the present disclosure.

In this embodiment, a material of the first sub-back plate 11 is metal or plastic, and a material of the second sub-back plate 12 is glass. In this way, by setting the material of the first sub-back plate 11 to be metal or plastic, the first sub-back plate 11 is enabled to be ultra-thin; thermal conductivity of metal or plastic is better than that of glass, and a more satisfactory heat dissipation function can be realized. Further, in other embodiments, as shown in FIG. 16, heat dissipation holes 118 may be arranged in the first sub-back plate 11 to further achieve a function of providing a heat dissipation effect. As compared with the provision of the heat dissipation holes in the back plate made of glass, the provision of the heat dissipation holes in the first sub-back plate 11 made of metal or plastic has an advantage of not increasing costs and remaining overall strength.

Specifically, the thickness of the second sub-back plate 12 is 1.8 mm to 2.0 mm; and the thickness of the first sub-back plate 11 is 0.1 mm to 0.8 mm.

The first sub-back plate 11 is fixedly connected to the second sub-back plate 12 or detachably connected to the second sub-back plate 12, which can be adjusted according to design requirements.

Figure 1:
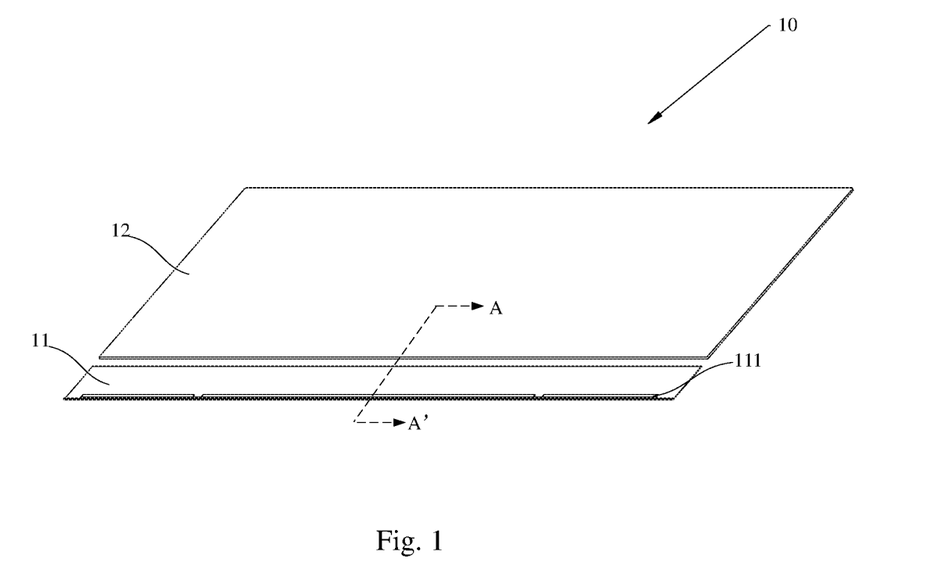
FIG. 1 is a three-dimensional structure schematic diagram of a first sub-back plate and a second sub-back plate in some embodiments of the present disclosure.
Figure 2:
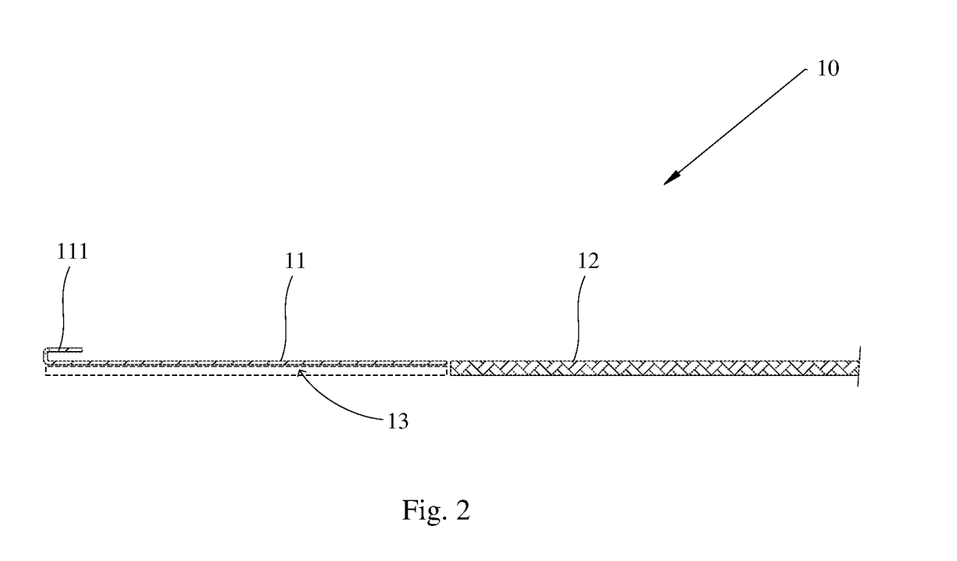
FIG. 2 is a partial cross-sectional structure schematic diagram of the first sub-back plate and the second sub-back plate along a direction A-A' in FIG. 1.

Specifically, as shown in FIG. 2, the gap space 13 of the first sub-back plate 11 is formed by the lower surface of the first sub-back plate 11 and a side surface of the second sub-back plate 12. That is, the gap space 13 is defined by the lower surface of the first sub-back plate 11 and the side surface of the second sub-back plate 12.

Further, the first sub-back plate 11 includes a hook part 111 provided at an end of the first sub-back plate 11 distal to the second sub-back plate 12. The upper surface of the second sub-back plate 12 is flush with an upper surface of an end of the first sub-back plate 11 close to the second sub-back plate 12, and the hook part 111 is located above a plane where the upper surface of the second sub-back plate 12 is flush with the upper surface of the end of the first sub-back plate 11 close to the second sub-back plate 12.

Figure 15:
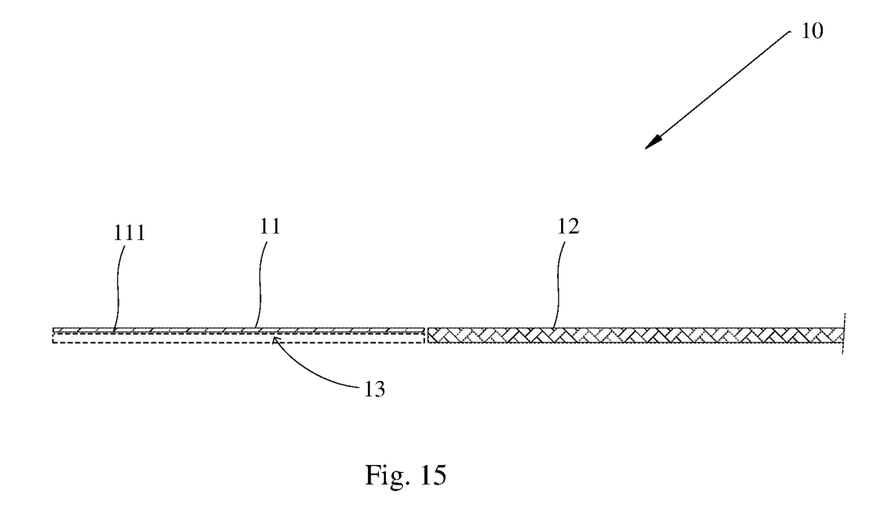
FIG. 15 is another cross-sectional schematic diagram of the first sub-back plate and the second sub-back plate in some embodiments of the present disclosure.

In other embodiments, the hook part 111 may not be provided, so that the first sub-back plate 11 is of a flat plate structure. In this case, the upper surface of the first sub-back plate 11 is completely flush with the upper surface of the second sub-back plate 12, as shown in FIG. 15.

Figure 3:
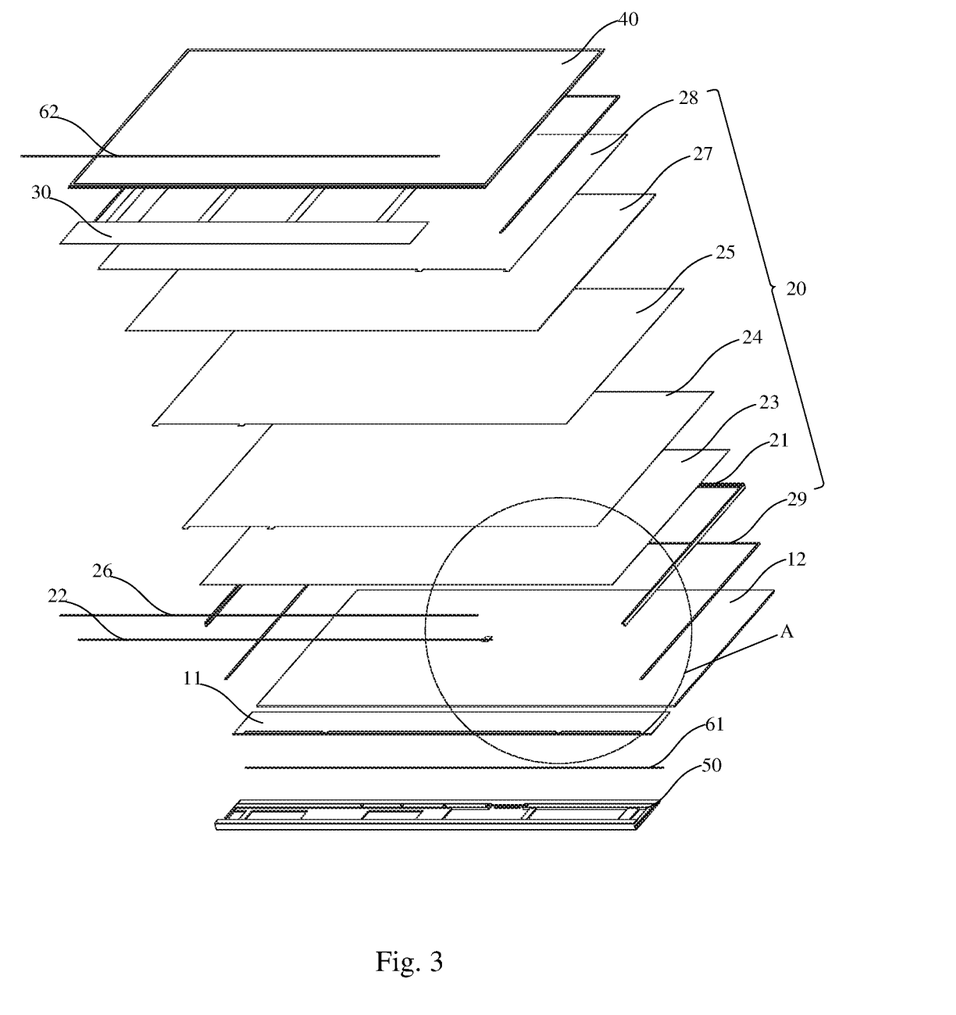
FIG. 3 is a three-dimensional structure schematic diagram of a display device in some embodiments of the present disclosure.
Figure 4:
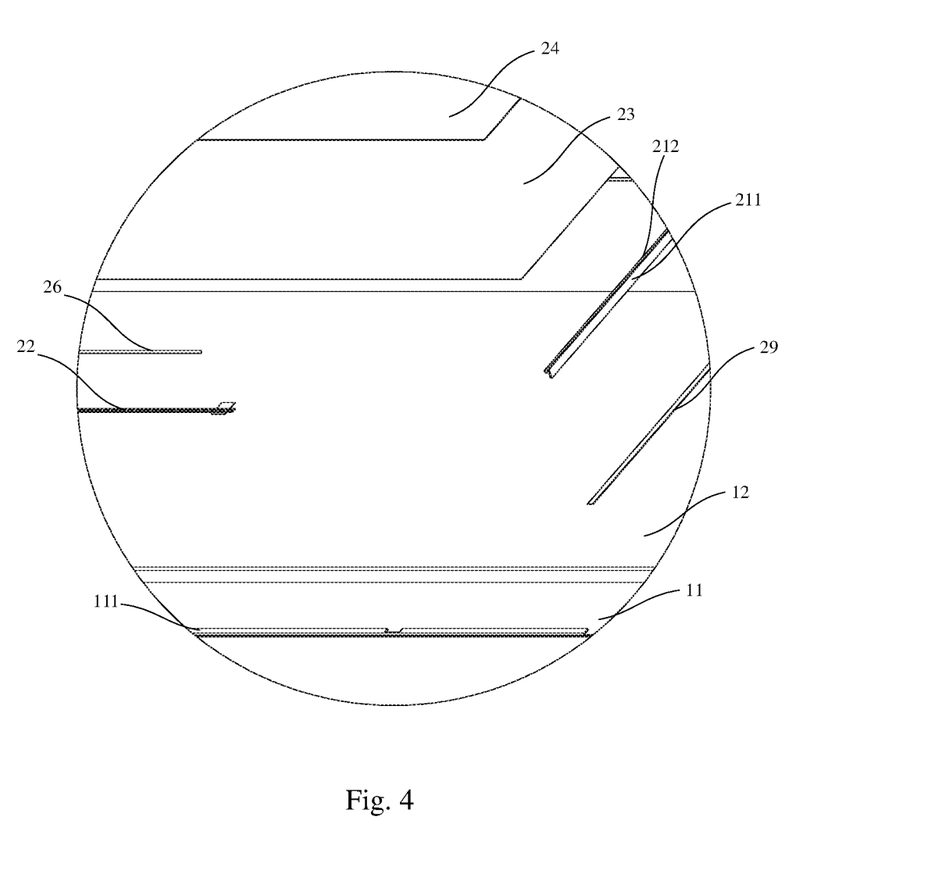
FIG. 4 is an enlarged view of a part A in FIG. 3.
Figure 5:
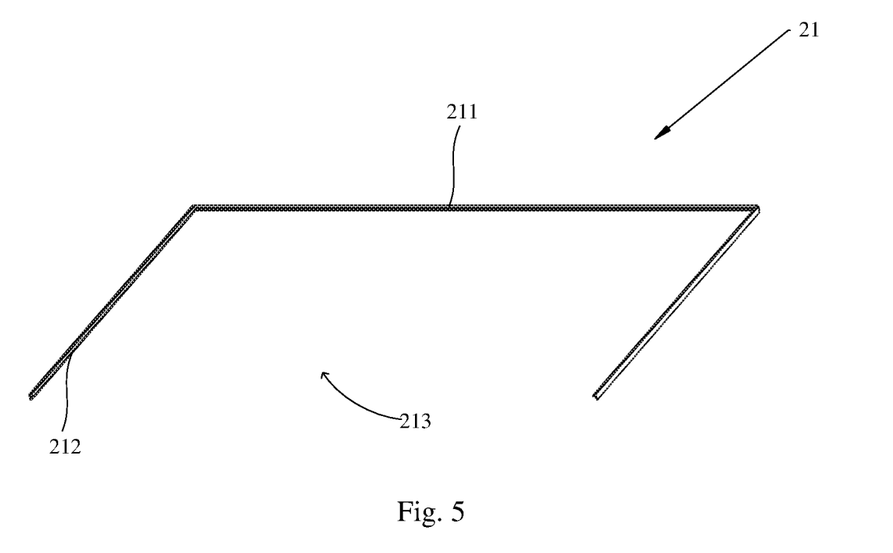
FIG. 5 is a three-dimensional structure schematic diagram of a frame in some embodiments of the present disclosure.

As shown in FIGS. 3-5, the present disclosure further provides a backlight module 20. The backlight module 20 includes the back plate 10 as described above, a frame 21, a light bar 22, a reflector 23, a light guide plate 24, a diffusion sheet 25, a light shielding sheet 26, a lower prism sheet 27, and an upper prism sheet 28.

The frame 21 includes a side plate 211 and a support platform 212 arranged perpendicular to the side plate 211. The first sub-back plate 11 and the second sub-back plate 12 are connected to a lower surface of the support platform 212 of the frame 21 through an adhesive tape 29. In this way, the first sub-back plate 11 and the second sub-back plate 12 can be more firmly fixed to the frame 21 through the adhesive tape 29.

The support platform 212 has a hollow region 213, and the light bar 22, the reflector 23, the light guide plate 24, the light shielding sheet 26, the diffusion sheet 25, the lower prism sheet 27, and the upper prism sheet 28 are all located in the hollow region 213 of the support platform 212. The light bar 22 is arranged on the first sub-back plate 11 and is arranged within the hook part 111 of the first sub-back plate 11. In this way, by providing the hook part 111, the light bar 22 can be confined.

The reflector 23 is arranged on the first sub-back plate 11 and the second sub-back plate 12; the light guide plate 24 is arranged on the reflector 23; the diffusion sheet 25 is arranged on the light guide plate 24; the light shielding sheet 26 is located above the light bar 22 and the light guide plate 24, an end of the light shielding sheet 26 is fixed in the hook part 111 of the first sub-back plate 11, and another end of the light shielding sheet 26 is located between the diffusion sheet 25 and the light guide plate 24; and the lower prism sheet 27 and the upper prism sheet 28, serving as optical films, are sequentially arranged on the diffusion sheet 25 in that order. The light shielding sheet is configured to prevent parasitic light from entering the light guide plate 24, so as to prevent the parasitic light from entering a picture region, and a black material may be used to absorb the parasitic light and optimize a light quality of the backlight module; or a white material may be used to reflect the parasitic light back, and a part of the light may re-enter the light guide plate 24, thereby improving light efficiency and providing a certain optimization of the light quality of the backlight module.

Figure 6:
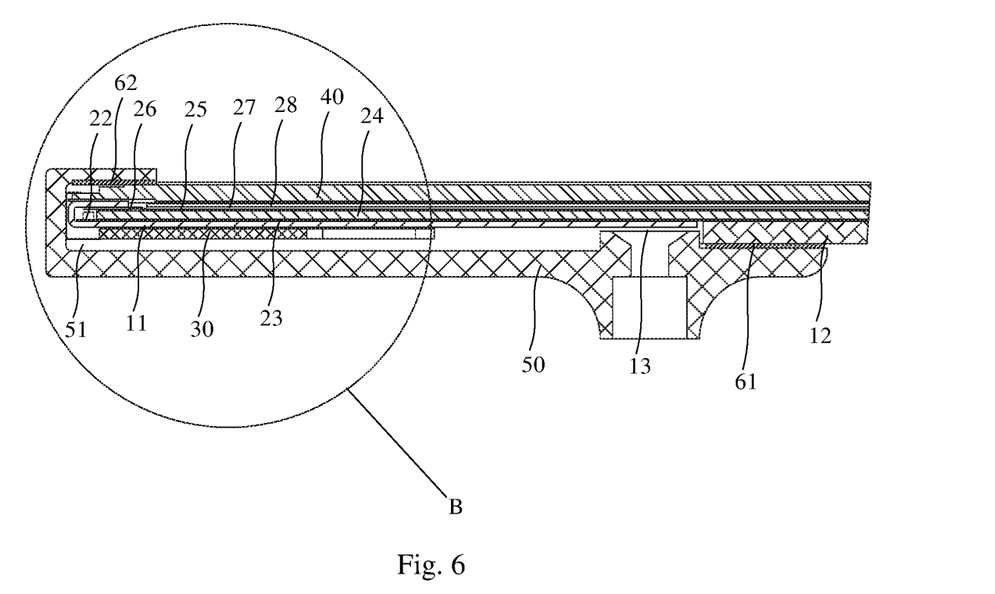
FIG. 6 is a partial cross-sectional structure schematic diagram of a display device in some embodiments of the present disclosure.
Figure 7:
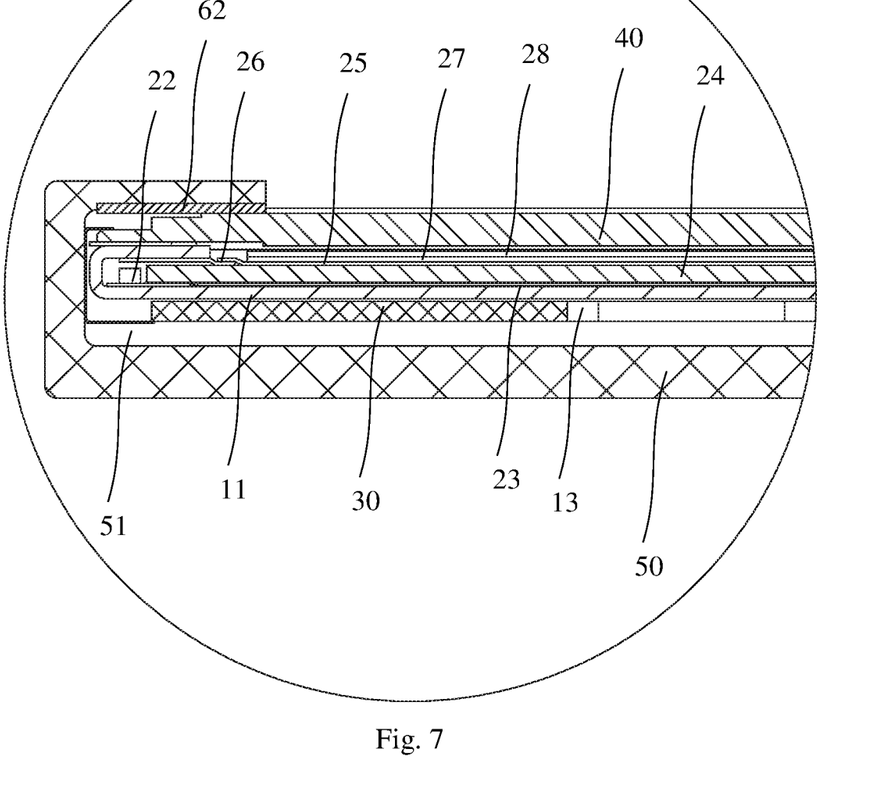
FIG. 7 is an enlarged view of a part B in FIG. 6.

As shown in FIGS. 6-7, the present disclosure further provides a display device. The display device includes the backlight module 20 as described above, a control panel 30, a liquid crystal display panel 40, and a rear cover 50. The liquid crystal display panel 40 is connected to the control panel 30. At least a part of the control panel 30 is arranged in the gap space 13 of the first sub-back plate 11. In this way, by arranging the control panel 30 in the gap space 13, a thickness of the display device may include a thickness of the second sub-back plate 12 and a thickness of a part of the control panel 30, or only the thickness of the second sub-back plate 12, and an effect of reducing overall thickness of the display device is achieved.

The liquid crystal display panel 40 is located above the hook part 111 of the first sub-back plate 11 and abuts against an upper surface of the hook part 111. In this way, by providing the hook part 111, the light bar 22 can be confined and the liquid crystal display panel 40 can be supported.

The rear cover 50 is provided with an accommodating cavity 51, the backlight module 20, the control panel 30, and the liquid crystal display panel 40 are all located within the accommodating cavity 51, and the second sub-back plate 12 in the backlight module 20 is fixed to a lower surface of the accommodating cavity 51 through an adhesive tape 61. The liquid crystal display panel 40 is fixed to an upper surface of the support platform 212 of the frame 21 in the backlight module 20 and the upper surface of the hook part 111 of the first sub-back plate 11 through the adhesive tape. Therefore, the liquid crystal display panel 40 is supported by the support platform 212 of the frame 21 and the hook part 111 of the first sub-back plate 11. A foam 62 is arranged between the liquid crystal display panel 40 and an upper surface of the accommodating cavity 51, and the foam 62 has a buffering effect.

In the back plate 10, the backlight module 20, and the display device of the above embodiments, the back plate 10 includes the first sub-back plate 11 and the second sub-back plate 12, and the thickness of the first sub-back plate 11 is smaller than that of the second sub-back plate, so that the gap space 13 is formed on the lower surface of the first sub-back plate 11, and the control panel 30 is arranged in the gap space 13. As a result, the thickness of the display device may include the thickness of the second sub-back plate 12 and a thickness of a part of the control panel 30, or only the thickness of the second sub-back plate 12, and an effect of reducing overall thickness of the display device is achieved.

In some other embodiments of the present disclosure, as shown in FIGS. 8 to 11, the overall structure of the back plate 10 is generally the same as that of the back plate 10 in the embodiments described above with reference to FIGS. 1 to 7, where the difference is that, the first sub-back plate 11 includes a main body 112 and a connecting part 113, an upper surface of the main body 112 is flush with the upper surface of the second sub-back plate 12, an end of the connecting part 113 is connected to the main body 112, and another end of the connecting part 113 is located below the sub-back plate 12 and is connected to the second sub-back plate 12.

In this embodiment, the gap space 13 is defined by a lower surface of the main body 112 and the connecting part 113.

Figure 8:
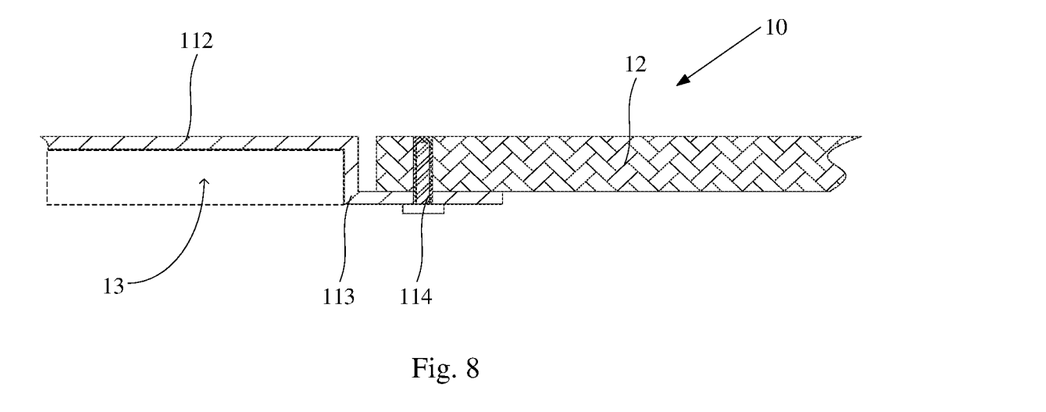
FIG. 8 is a partial cross-sectional structure schematic diagram of the first sub-back plate and the second sub-back plate along a direction B-B' in FIG. 14.
Figure 9:
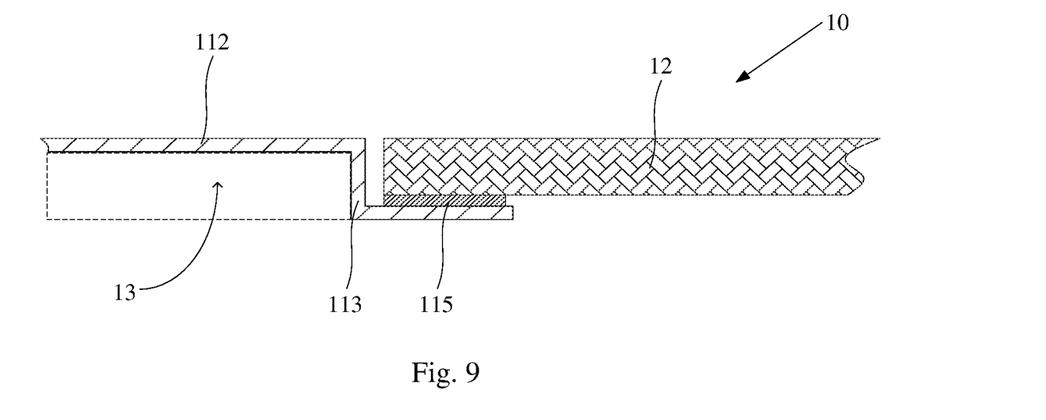
FIG. 9 is another partial cross-sectional structure schematic diagram of the first sub-back plate and the second sub-back plate along the direction B-B' in FIG. 14.

In this embodiment, the connecting part 113 and the second sub-back plate 12 can be connected in various ways according to the design requirements. The connecting part 113 may be connected to the second sub-back plate 12 through a fixing piece, so that the connecting part 113 is firmly connected to the second sub-back plate 12. As shown in FIG. 8, the fixing piece is a screw 114, and the connecting part 113 and the second sub-back plate 12 are riveted through the screw 114. In another embodiment, as shown in FIG. 9, the fixing piece is an adhesive layer 115, and the connecting part 113 and the second sub-back plate 12 are bonded by the adhesive layer 115.

Figure 10:
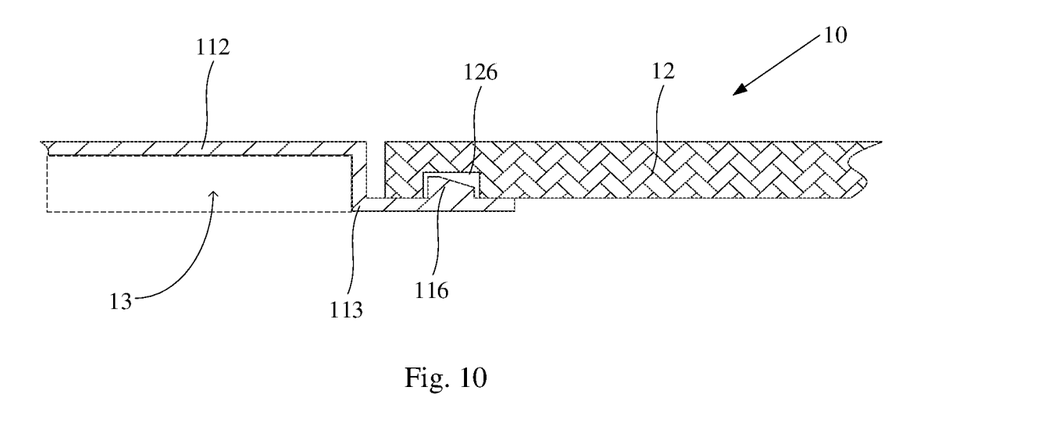
FIG. 10 is yet another partial cross-sectional structure schematic diagram of the first sub-back plate and the second sub-back plate along the direction B-B' in FIG. 14.

In yet another embodiment, as shown in FIG. 10, an end of the connecting part 113 distal to the main body 112 is clamped with the second sub-back plate 12. Specifically, a fixing protrusion 116 is arranged on an end of the connecting part 113 distal to the main body 112, and a fixing groove 126 is arranged at a position of the second sub-back plate 12 corresponding to the fixing protrusion 116. The fixing protrusion 116 is clamped into the fixing groove 126, so as to connect the connecting part 113 with the second sub-back plate 12. However, the present disclosure is not limited thereto. In some other embodiments, alternately, the fixing protrusion may be arranged on the second sub-back plate 12, and the fixing groove is arranged at a position of the connecting part 113 corresponding to the fixing protrusion. In this way, the first sub-back plate 11 and the second sub-back plate 12 can be easily separated from each other through the detachable connection mode of clamping, and maintenance work is facilitated.

Figure 11:
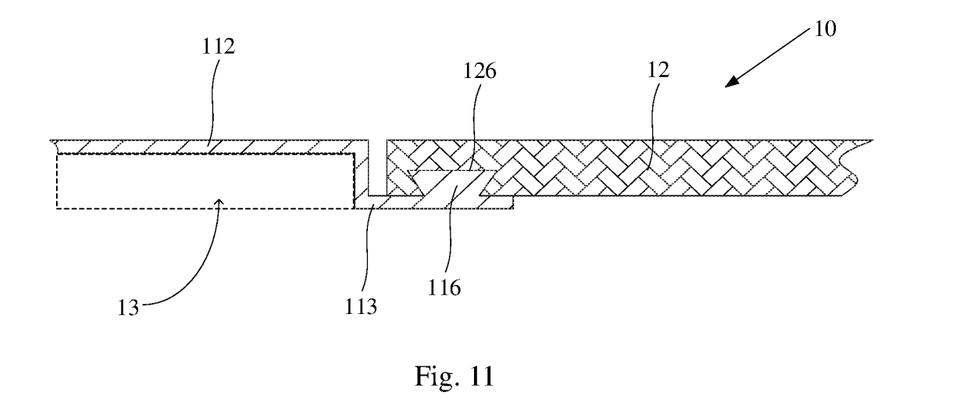
FIG. 11 is still yet another partial cross-sectional structure schematic diagram of the first sub-back plate and the second sub-back plate along the direction B-B' in FIG. 14.

In still another embodiment, as shown in FIG. 11, the fixing protrusion 116 may be formed in the fixing groove 126 by injection molding.

Figure 12:
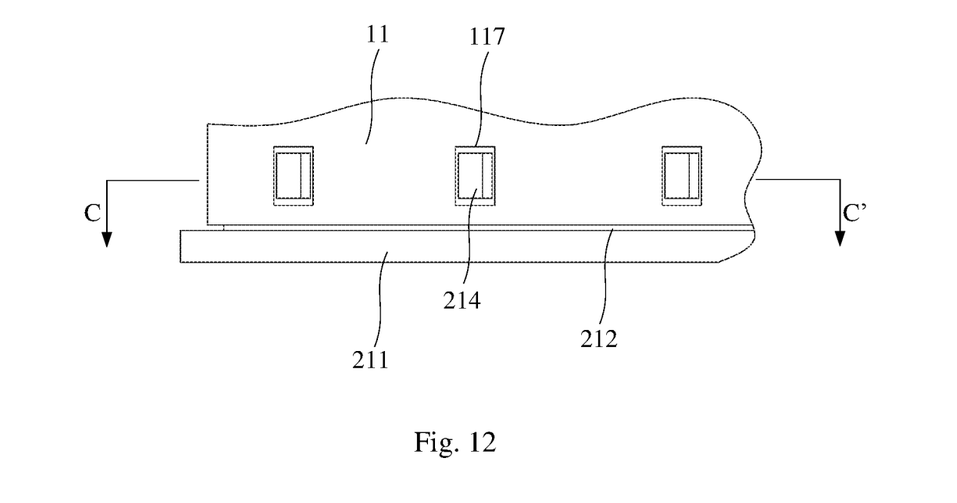
FIG. 12 is a partial bottom structure schematic diagram of the first sub-back plate and the frame in some embodiments of the present disclosure.
Figure 13:
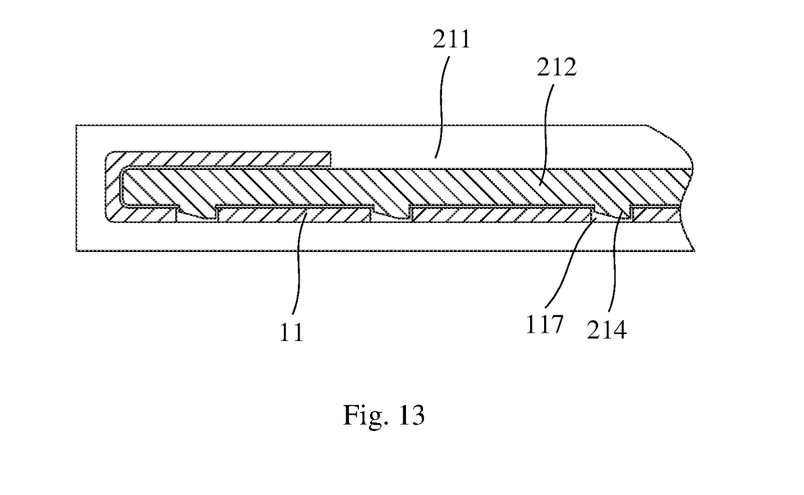
FIG. 13 is a cross-sectional schematic structure diagram taken along a direction C-C' in FIG. 12.
Figure 14:
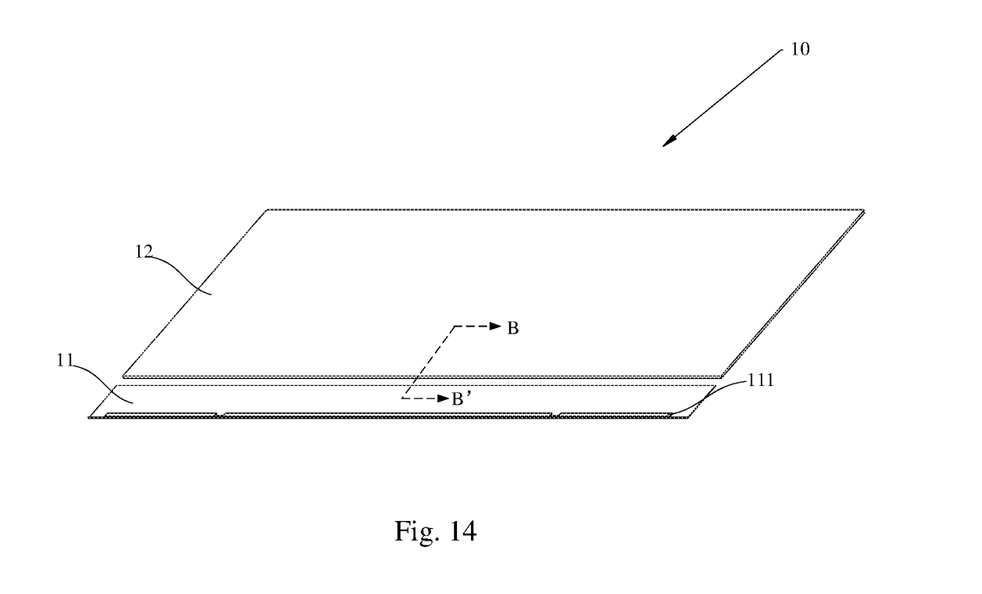
FIG. 14 is another three-dimensional structure schematic diagram of the first sub-back plate and the second sub-back plate in some embodiments of the present disclosure.

In some embodiments of the present disclosure, as shown in FIG. 12 and FIG. 13, the overall structure of the backlight module 20 is generally the same as that of the backlight module 20 in the embodiments described with reference to FIGS. 1 to 7, where the difference is that, while the first sub-back plate 11 is fixed to the lower surface of the support platform 212 of the frame 21 through the adhesive tape 29, the first sub-back plate 11 and the frame 21 are snap-fitted to define a position of the first sub-back plate 11 relative to a horizontal direction of the frame 21. In this way, by snap-fitting of the first sub-back plate 11 and the frame 21, the position of the first sub-back plate 11 relative to the horizontal direction of the frame 21 is defined, and stability of the product is effectively increased.

In this embodiment, a confining protrusion 214 is arranged on the support platform 212 of the frame 21, and a limiting groove 117 is arranged at a position of the first sub-back plate 11 corresponding to the confining protrusion 214. The confining protrusion 214 the limiting groove 117 are snap-fitted, thereby defining the position of the first sub-back plate 11 relative to the horizontal direction of the frame 21, that is, the first sub-back plate 11 and the frame 21 may not move relative to each other in the horizontal direction, thereby improving the stability of the product. In addition, the confining protrusion 214 and the limiting groove 117 are snap-fitted, so that when the first sub-back plate 11 is mounted on the frame 21, it may play a positioning role. However, the present disclosure is not limited thereto. In other embodiments, alternately, the confining protrusion may be arranged on the first sub-back plate 11, and the limiting groove is arranged at a position of the frame 21 corresponding to the confining protrusion.

The above are only optional embodiments of the present disclosure, and the present disclosure is not limited thereto. Any modification, equivalent replacement, improvement, and the like made within the spirit and principles of the present disclosure shall be included in the protection scope of the present disclosure.

What is claimed is:

1. A back plate comprising a first sub-back plate and a second sub-back plate connected to each other, wherein:
   a thickness of the first sub-back plate is less than a thickness of the second sub-back plate;
   at least a part of a first main surface of the first sub-back plate is flush with a first main surface of the second sub-back plate;
   a gap space is formed on a second main surface of the first sub-back plate; and
   the first main surface of the first sub-back plate is arranged opposite to the second main surface of the first sub-back plate,
   wherein the first sub-back plate comprises a hook part provided at an end of the first sub-back plate distal to the second sub-back plate, and the hook part is located above a plane where at least the part of the first main surface of the first sub-back plate is flush with the first main surface of the second sub-back plate.

2. The back plate according to claim 1, wherein the gap space is defined by the second main surface of the first sub-back plate and a side surface of the second sub-back plate.

3. The back plate according to claim 1, wherein a material of the first sub-back plate is metal or plastic, and a material of the second sub-back plate is glass.

4. The back plate according to claim 1, wherein the first sub-back plate is fixedly connected to the second sub-back plate or detachably connected to the second sub-back plate.

5. The back plate of claim 1, wherein an entirety of the first main surface of the first sub-back plate is completely flush with an entirety of the first main surface of the second sub-back plate.

6. The back plate according to claim 1, wherein a heat dissipation hole is provided in the first sub-back plate.

7. The back plate according to claim 1, wherein a thickness of the second sub-back plate is 1.8 mm to 2.0 mm, and a thickness of the first sub-back plate is 0.1 mm to 0.8 mm.

8. A backlight module comprising the back plate according to claim 1 and a light bar, wherein the first sub-back plate is arranged close to the light bar, and the second sub-back plate is arranged on a side of the first sub-back plate distal to the light bar.

9. The backlight module according to claim 8, wherein the backlight module further comprises a frame, the frame is located above the first sub-back plate and the second sub-back plate, and the first sub-back plate and the second sub-back plate are both connected to the frame.

10. The backlight module according to claim 9, wherein the first sub-back plate and the second sub-back plate are connected to the frame by an adhesive tape.

11. The backlight module of claim 9, wherein the first sub-back plate and the frame are snap-fitted to define a position of the first sub-back plate relative to a horizontal direction of the frame.

12. The backlight module of claim 8, wherein the gap space is defined by the second main surface of the first sub-back plate and a side surface of the second sub-back plate.

13. The backlight module according to claim 8, wherein a material of the first sub-back plate is metal or plastic, and a material of the second sub-back plate is glass.

14. A backlight module comprising the back plate according to claim 1 and a light bar, wherein the light bar is arranged in the hook part of the first sub-back plate.

15. A display device comprising the backlight module according to claim 8 and a control panel, wherein at least a part of the control panel is arranged in the gap space.

16. A display device comprising the backlight module according to claim 14, a control panel, and a liquid crystal display panel connected to the control panel, wherein at least a part of the control panel is arranged in the gap space, the liquid crystal display panel is located above the hook part of the first sub-back plate, and abuts against a surface of the hook part, and the surface of the hook part is distal to the plane where at least the part of the first main surface of the first sub-back plate is flush with the first main surface of the second sub-back plate.

17. The display device according to claim 15, wherein the gap space is defined by the second main surface of the first sub-back plate and a side surface of the second sub-back plate.

18. The display device according to claim 15, wherein a material of the first sub-back plate is metal or plastic, and a material of the second sub-back plate is glass.

19. The display device according to claim 15, wherein the first sub-back plate is fixedly connected to the second sub-back plate or detachably connected to the second sub-back plate.

20. The display device according to claim 15, wherein an entirety of the first main surface of the first sub-back plate is completely flush with an entirety of the first main surface of the second sub-back plate.

* * * * *